(12) United States Patent
Hezkiahu

(10) Patent No.: US 11,945,538 B2
(45) Date of Patent: Apr. 2, 2024

(54) CLUTCH ASSIST DEVICE

(71) Applicant: Ran Hezkiahu, Scotsdale, AZ (US)

(72) Inventor: Ran Hezkiahu, Scotsdale, AZ (US)

( * ) Notice: Subject to any disclaimer, the term of this patent is extended or adjusted under 35 U.S.C. 154(b) by 0 days.

(21) Appl. No.: 18/055,426

(22) Filed: Nov. 15, 2022

(65) Prior Publication Data

US 2023/0365218 A1 Nov. 16, 2023

Related U.S. Application Data

(60) Provisional application No. 63/330,326, filed on Apr. 13, 2022.

(51) Int. Cl.
*B62K 23/06* (2006.01)
*G05G 7/04* (2006.01)

(52) U.S. Cl.
CPC .............. *B62K 23/06* (2013.01); *G05G 7/04* (2013.01)

(58) Field of Classification Search
None
See application file for complete search history.

(56) References Cited

U.S. PATENT DOCUMENTS

| | | | | |
|---|---|---|---|---|
| 4,286,700 A * | 9/1981 | Morris | ............... | B62K 23/04 74/504 |
| 4,301,694 A | 11/1981 | Costa | | |
| 7,395,912 B2 * | 7/2008 | Ooishi | ............... | F16D 23/12 192/101 |
| 11,021,205 B2 * | 6/2021 | Johnson | ............... | F16D 28/00 |

FOREIGN PATENT DOCUMENTS

| WO | 2007/128058 | 11/2007 |
|---|---|---|

OTHER PUBLICATIONS

European Search Report, EP 22208332, dated Aug. 15, 2023 (with cover letter of Aug. 15, 2023).

* cited by examiner

*Primary Examiner* — Vicky A Johnson
(74) *Attorney, Agent, or Firm* — Dekel Patent Ltd.; David Klein

(57) ABSTRACT

A motorcycle clutch assist device including a spring arm arranged for rotation or pivoting inside a housing, a biasing device coupled at one end thereof to an axle of the spring arm and at an opposite end thereof to a spring adaptor, and a shaft, one end of which is fixed to the spring arm and an opposite end of which is fixable to the clutch handle, such that the clutch handle rotates about a central longitudinal axis of the shaft and squeezing the clutch handle transfers torque to the spring arm via the shaft, wherein when the biasing device is aligned with the central longitudinal axis no torque is applied by the biasing device, and squeezing the clutch handle causes the biasing device to move past the central longitudinal axis so that the biasing device applies an auxiliary torque to torque applied by squeezing the clutch handle.

10 Claims, 12 Drawing Sheets

FORCES GENERATED WHILE SQUEEZING
HANDLE THROUGH ANGLE THETA

INCREASE IN MOMENT ARM (H) IS GREATER THAN DECREASE IN BIASING FORCE SUCH THAT OVERALL TORQUE (T) GENERATED INCREASES WITH DECREASING ANGLE $\theta$

CLUTCH ASSIST DEVICE

FIELD OF THE INVENTION

The present invention relates to vehicle clutch mechanisms and particularly to a clutch assist device which can reduce the force necessary to operate a friction clutch to engage and disengage a transmission of a motorcycle.

BACKGROUND OF THE INVENTION

A motorcycle is equipped with a friction clutch that operates to engage and disengage a transmission. With the clutch engaged, the transmission transfers torque from the engine crankshaft to one or more wheels of the motorcycle and, with the clutch disengaged, the transmission is decoupled from the engine so as not transfer a driving torque to the wheel(s). The friction clutch typically has friction plates and clutch plates laid alternately next to one another. A clutch spring presses the friction plates against the clutch plates and biases the friction plates into this state so as to transmit torque.

The clutch has a clutch release mechanism. The clutch release mechanism, which is used to release the pressure against the friction plates caused by the clutch spring, is coupled to a clutch operating lever via a clutch wire. A Bowden-wire cable is often used as the clutch wire and includes an inner wire that slides relative to an outer sheath. The clutch operating lever is usually disposed on the handlebars of the motorcycle. When the rider squeezes the clutch operating lever, the friction plates are separated from the clutch plates, against the urging force of the clutch spring, to disengage the clutch and, hence, the transmission from the engine.

With a friction clutch used in a high-power, high-revolution engine, it is desired to set the biasing load of the clutch spring to a high value to increase the torque capacity of the clutch. However, since the clutch operating lever is operated manually, it often is difficult for at least some riders to operate the clutch operating lever when the biasing load of the clutch spring is increased.

U.S. Pat. No. 7,395,912 describes a clutch assisting device, which has an auxiliary force member (e.g., a spring) that urges the clutch wires in such a direction as to disengage the friction clutch while the clutch lever is moved from a disengage start position, where the clutch lever receives the reactive force of the clutch spring, to a disengaged position, where the disengagement of the friction clutch is completed. The assist mechanism maintains the urging force of the auxiliary spring applied to the clutch wires within a fixed range while the clutch lever is shifted from the midpoint between the disengage start position and the disengaged position to the disengage position. The clutch assist device reduces the manual force required to operate the clutch while preserving the operational feel of the clutch lever when moving the lever from a released position to a half clutched position, to a full clutch position.

FIGS. 1A and 1B illustrate an example of a prior art hydraulic clutch system. The system includes a pump 1, which is mounted on the handlebar and is activated by the user pulling handle 2. As seen in FIG. 1A, pump 1 is connected by an oil line 3 to a cylinder 4 (mounted near the clutch), which has a piston 5 that presses against the clutch plate springs. As seen in FIG. 1B, handle 2 has a pusher 6 which is arranged to push against an end of a hydraulic piston shaft 7. The hydraulic piston shaft 7 is connected to the internal piston 5. The movement of the internal piston 5 generates the oil movement that causes movement of the clutch or friction plates.

The motorcycle clutch handle of the prior art is pivoted to the handlebar about a pivot screw 8, which is typically provided with a bearing.

SUMMARY OF THE INVENTION

The present invention seeks to provide a novel clutch assist device, as described in detail below.

The motorcycle clutch handle of the prior art is pivoted to the handlebar with a screw; the clutch handle rotates about this screw via a bearing. The novel clutch assist device replaces this screw with a longer screw or post (referred to herein as a shaft, which may or may not be threaded), one end of which is secured to the clutch handle and the other end of which is coupled to the clutch assist device. Squeezing the clutch handle transfers torque to the clutch assist device via this shaft.

Normally when the rider does not squeeze the clutch handle, no force is exerted on the friction or clutch plates of the motorcycle. Instead of relying on the lack of any squeezing, the clutch assist device may apply a small, off-center biasing force in a direction opposite to the handle squeezing force, which makes sure that when the clutch handle is not squeezed, the clutch assist device does not in any way cause the friction or clutch plates to engage, thus ensuring disengagement of the friction or clutch plates.

The clutch assist device may include an adjustment device (e.g., an adjustment screw) to adjust the assistive force provided by the device to assist in clutching. The clutch assist device does not interfere with hand guards.

There are predetermined rotational angles of the clutch handle relative to the clutch's oil piston, typically set by the manufacturer. The clutch assist device does not change these rotational angles in any way.

The clutch assist device can be mounted above, below or to the side of the existing pump, or in any other orientation. The clutch assist device can linearly increase the torque or force needed for squeezing the clutch handle.

There is thus provided in accordance with a non-limiting embodiment of the present invention a motorcycle clutch assist device including a spring arm arranged for rotation or pivoting inside a housing, a biasing device coupled at one end thereof to an axle of the spring arm and at an opposite end thereof to a spring adaptor, and a shaft, one end of which is fixed to the spring arm and an opposite end of which is fixable to the clutch handle, such that the clutch handle rotates about a central longitudinal axis of the shaft and squeezing the clutch handle transfers torque to the spring arm via the shaft, wherein when the biasing device is aligned with the central longitudinal axis no torque is applied by the biasing device, and squeezing the clutch handle causes the biasing device to move past the central longitudinal axis so that the biasing device applies an auxiliary torque to torque applied by squeezing the clutch handle.

In accordance with a non-limiting embodiment of the present invention a spring tension screw is coupled to the biasing device and operative to adjust tension of the biasing device.

In accordance with a non-limiting embodiment of the present invention the shaft is fixable to the clutch handle with a handle locking screw that fixedly abuts against a first flat surface of the shaft, and the shaft is fixed to the spring arm with a shaft screw that fixedly abuts against a second flat surface of the shaft.

In accordance with a non-limiting embodiment of the present invention a rest position of the biasing device is offset from the central longitudinal axis in a direction opposite to a squeezing force of the clutch handle.

In accordance with a non-limiting embodiment of the present invention a clutch pump is coupled to the housing by means of a pump locking screw.

BRIEF DESCRIPTION OF THE DRAWINGS

The present invention will be understood and appreciated more fully from the following detailed description, taken in conjunction with the drawings in which.

DETAILED DESCRIPTION OF EMBODIMENTS

Figure 2:
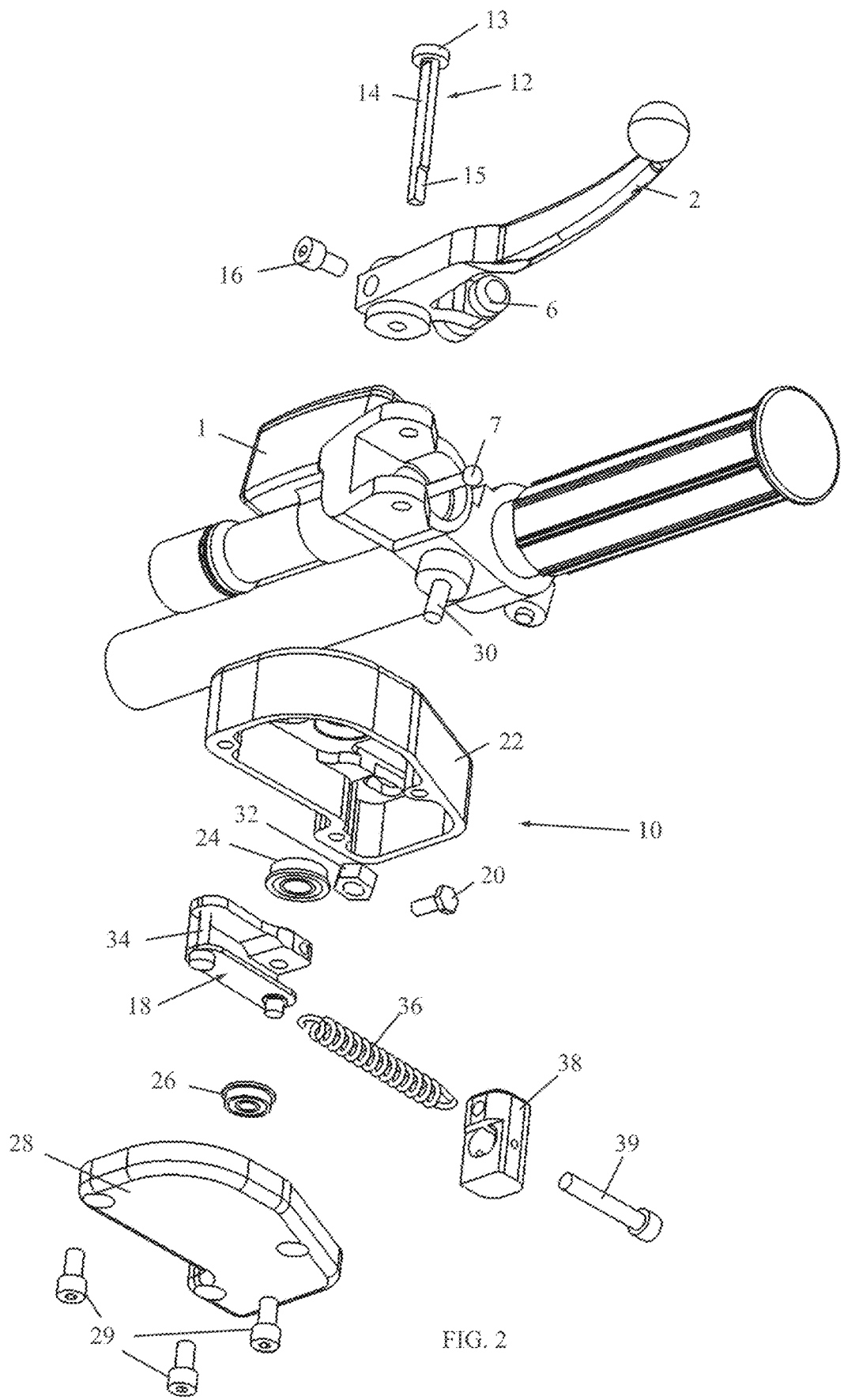
FIG. 2 is a simplified exploded illustration of a clutch assist device, constructed and operative in accordance with a non-limiting embodiment of the present invention.

Reference is now made to FIG. 2, which illustrates a clutch assist device 10, constructed and operative in accordance with a non-limiting embodiment of the present invention. The clutch assist device 10 may be provided as part of the original motorcycle or may be provided as an aftermarket accessory, easily mounted on the motorcycle handlebar.

Figure 1A:
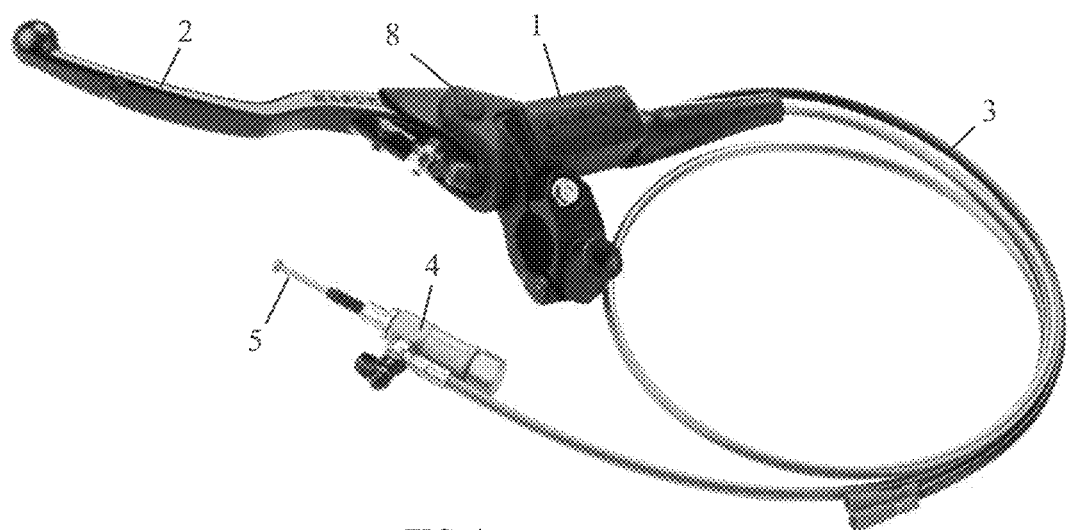
FIGS. 1A and 1B illustrate an example of a prior art hydraulic clutch system.
Figure 1B:
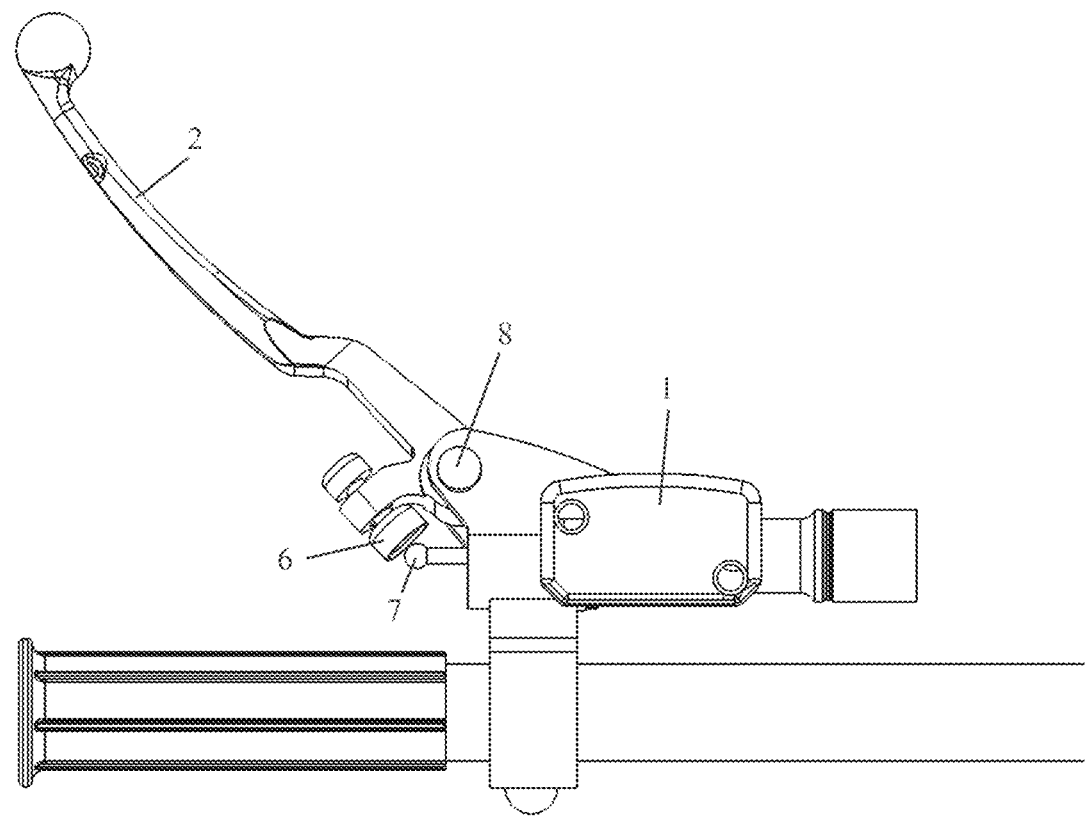

As mentioned previously with reference to FIGS. 1A and 1B, the motorcycle clutch handle of the prior art is pivoted to the handlebar with a pivot screw; the clutch handle rotates about this screw via a bearing. In contrast, in the present invention, clutch assist device 10 replaces this screw with a longer screw or post, referred to herein as a shaft 12. Shaft 12 is shown not threaded, but alternatively could be threaded. In the illustrated embodiment, shaft 12 has a head 13 and a first flat surface 14 and a second flat surface 15, perpendicular to first flat surface 14. The flat surfaces 14 and 15 are preferably formed at specific angles to maintain the correct angle between the spring arm and the clutch handle (described below) and can vary from 0-360°. However, the invention is not limited to such flat surfaces and other methods of maintaining the correct angle may be used.

Figure 5:
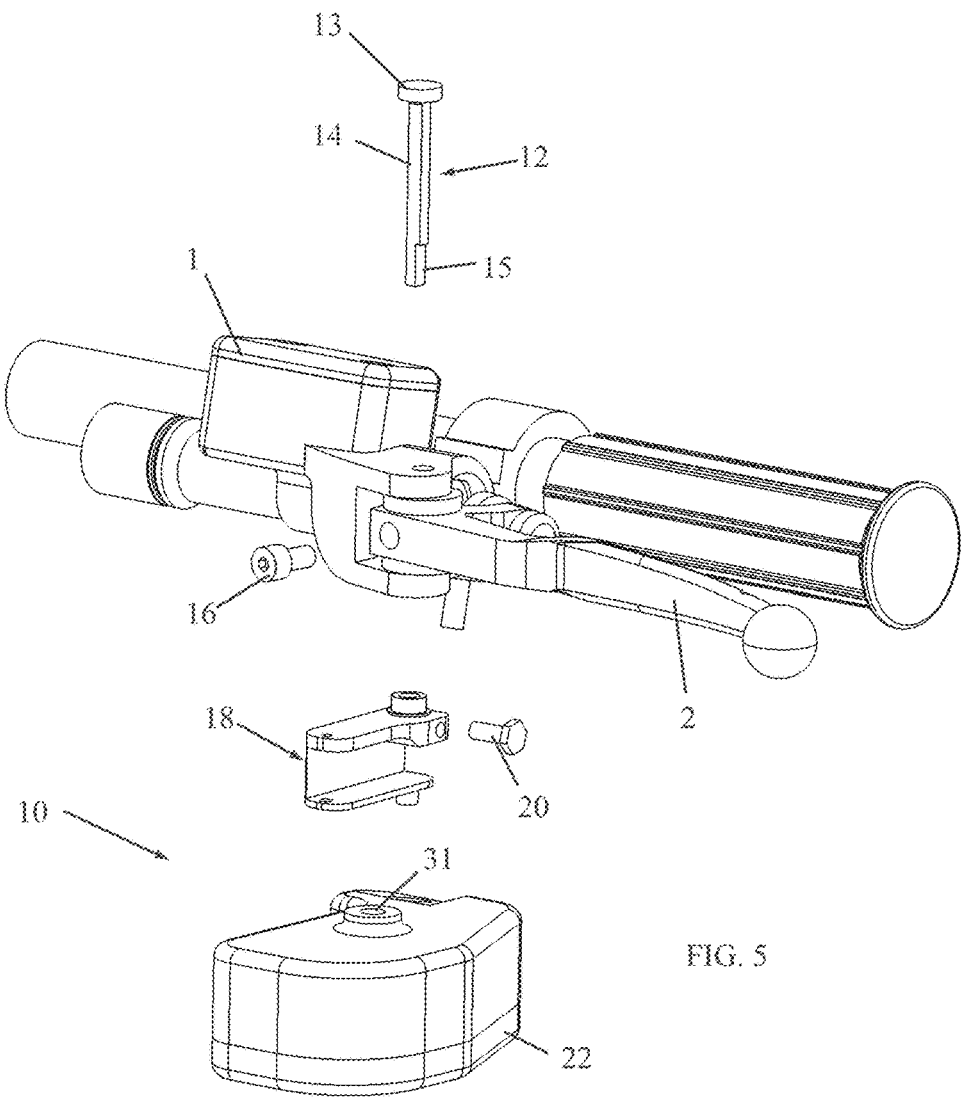
Figure 6:
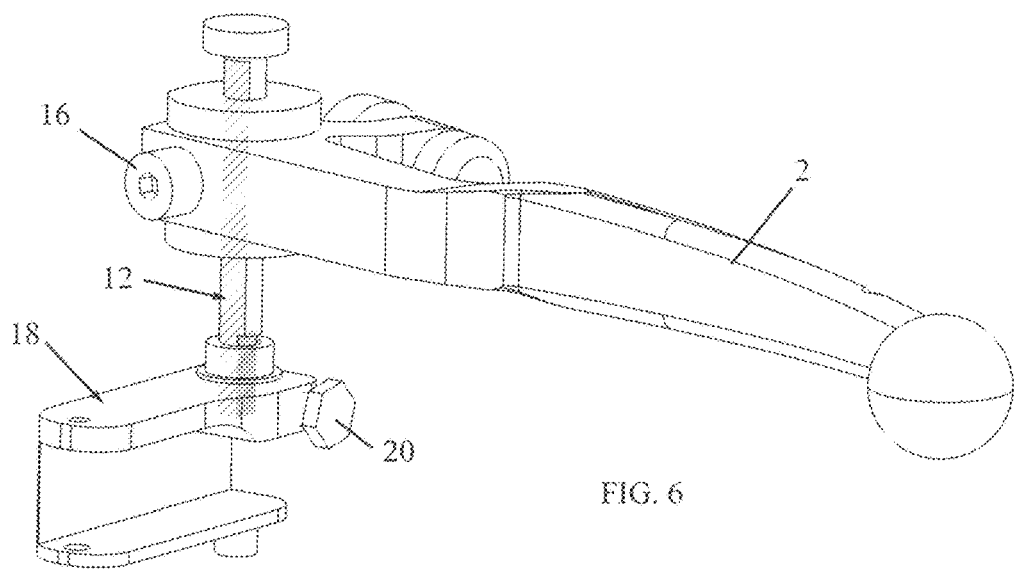

Shaft 12 mounts through the same mounting hole as the pivot screw of the prior art handle. In contrast, in the present invention, shaft 12 is fixed to the handle 2 with a handle locking screw 16 that fixedly abuts against first flat surface 14, and shaft 12 is fixed to a spring arm 18 of clutch assist device 10 with a shaft screw 20 that fixedly abuts against second flat surface 15 (see also FIGS. 5 and 6). Other methods of securing the shaft 12 may be used. Accordingly, one end of shaft 12 is secured to the clutch handle 2 and the other end of which is coupled to spring arm 18 of the clutch assist device 10. Squeezing the clutch handle 2 transfers torque to spring arm 18 via shaft 12.

Figure 4:
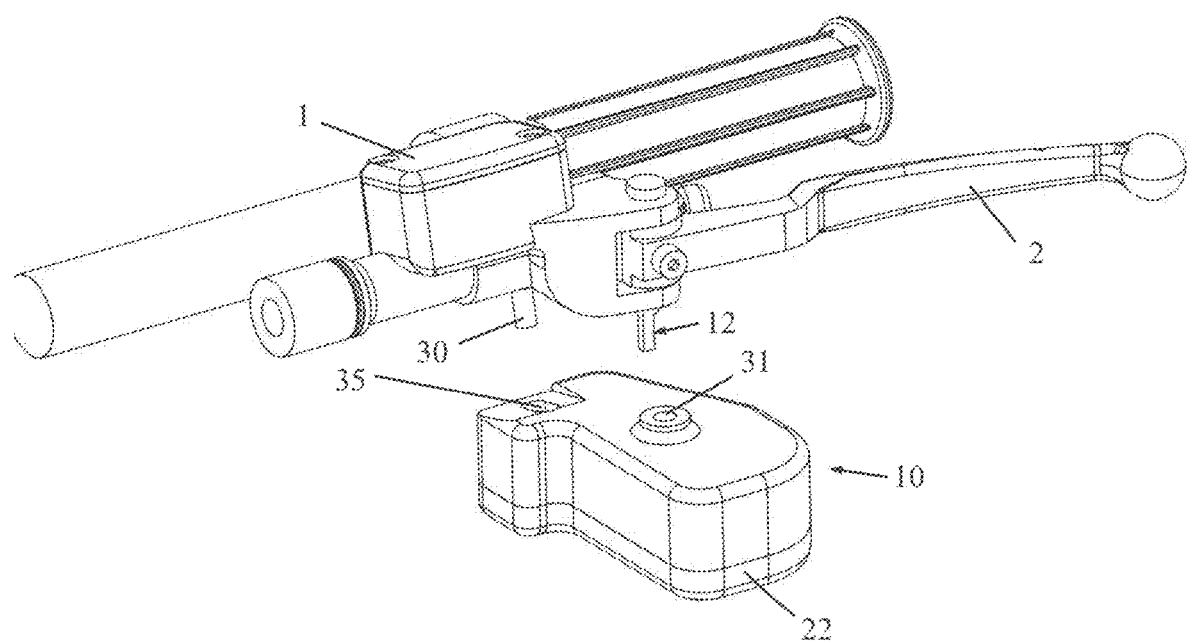
FIGS. 4, 5 and 6 are simplified pictorial illustrations of attaching the clutch assist device to the existing handle and pump.

The clutch assist device 10 includes a housing 22. The spring arm 18 is journaled (arranged for rotation or pivoting) inside housing 22 by means of first and second bearings 24 and 26. Housing 22 is closed by a cover 28, which is secured by fasteners 29. Shaft 12 enters housing 12 through a hole 31 (shown in FIGS. 4 and 5).

The pump 1 may be coupled to housing 22 by means of a pump locking screw 30, which enters housing 22 through a hole 35 (shown in FIG. 4) and is secured by a pump locking nut 32.

Figure 7:
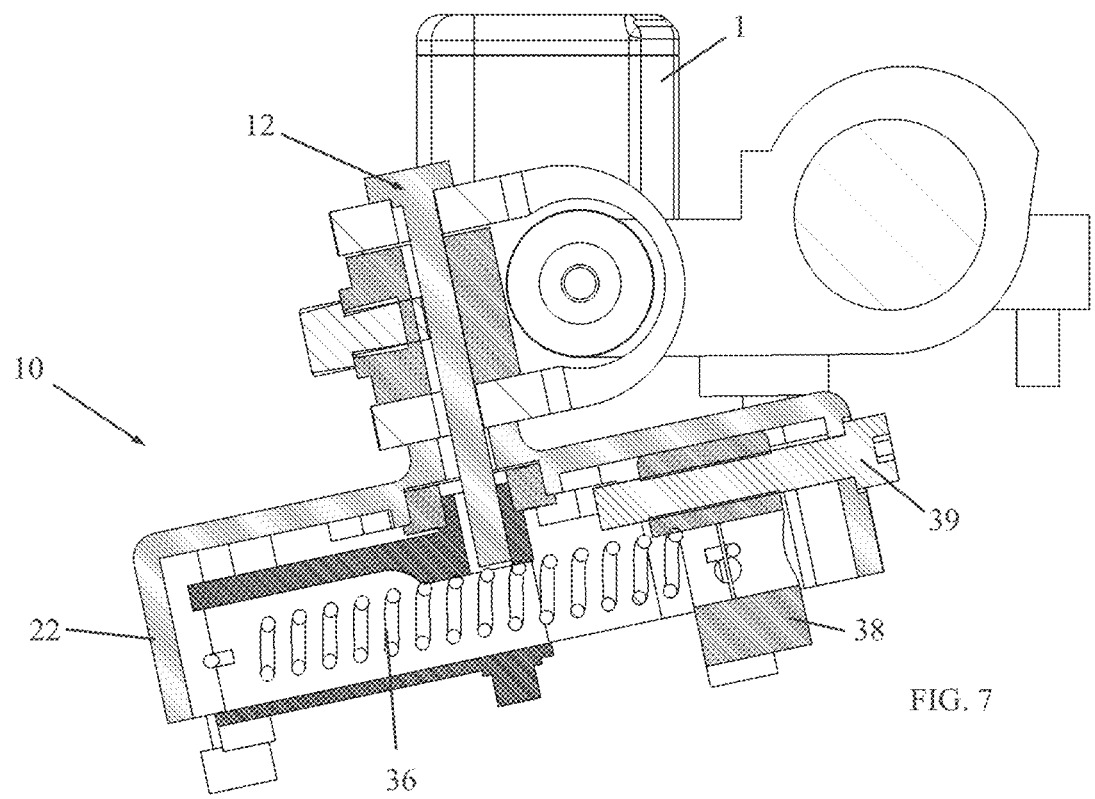
FIGS. 7 and 8 are further simplified sectional and pictorial illustrations, respectively, of the mounted clutch assist device.
Figure 8:
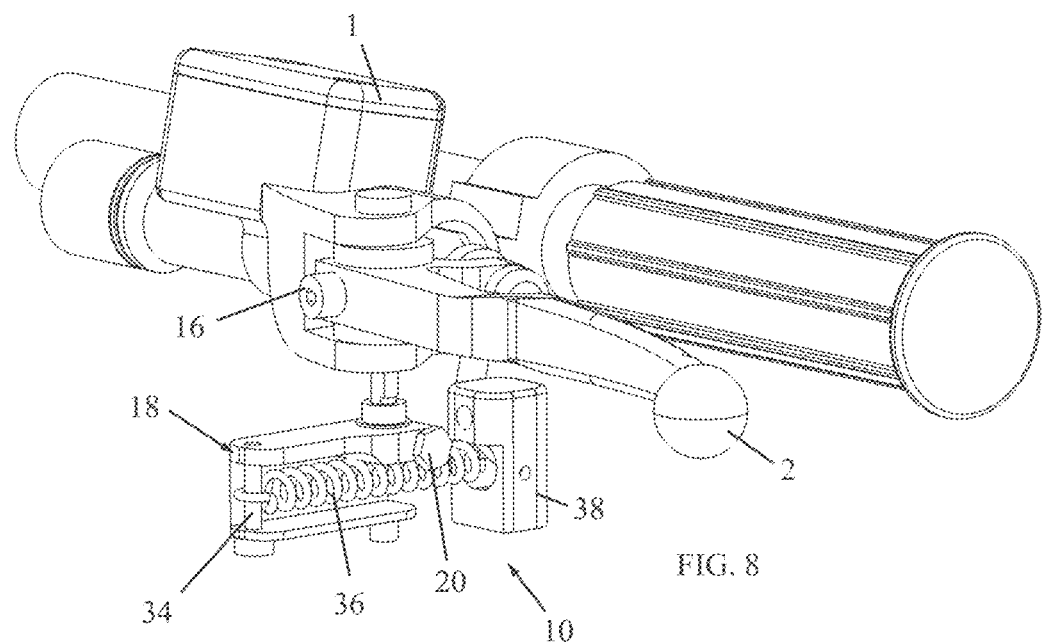

The spring arm 18 includes an axle 34. A biasing device 36, such as a coil spring, is coupled at one end thereof to axle 34 and at an opposite end thereof to a spring adaptor 38. The tension of biasing device 36 may be adjusted by tightening or loosening a spring tension screw 39. As seen in FIG. 7, the head of spring tension screw 39 is external to housing 22. The spring tension screw 39 passes through housing 22 into spring adaptor 38. Tightening spring tension screw 39 moves spring adaptor 38 closer to the inner wall of housing 22 (thus increasing the tension of biasing device 36); loosening spring tension screw 39 moves spring adaptor 38 away from the inner wall of housing 22 (thus decreasing the tension of biasing device 36). Other methods of adjusting the spring tension may be used, such as but not limited to, an eccentric arm or cam.

Figure 3:
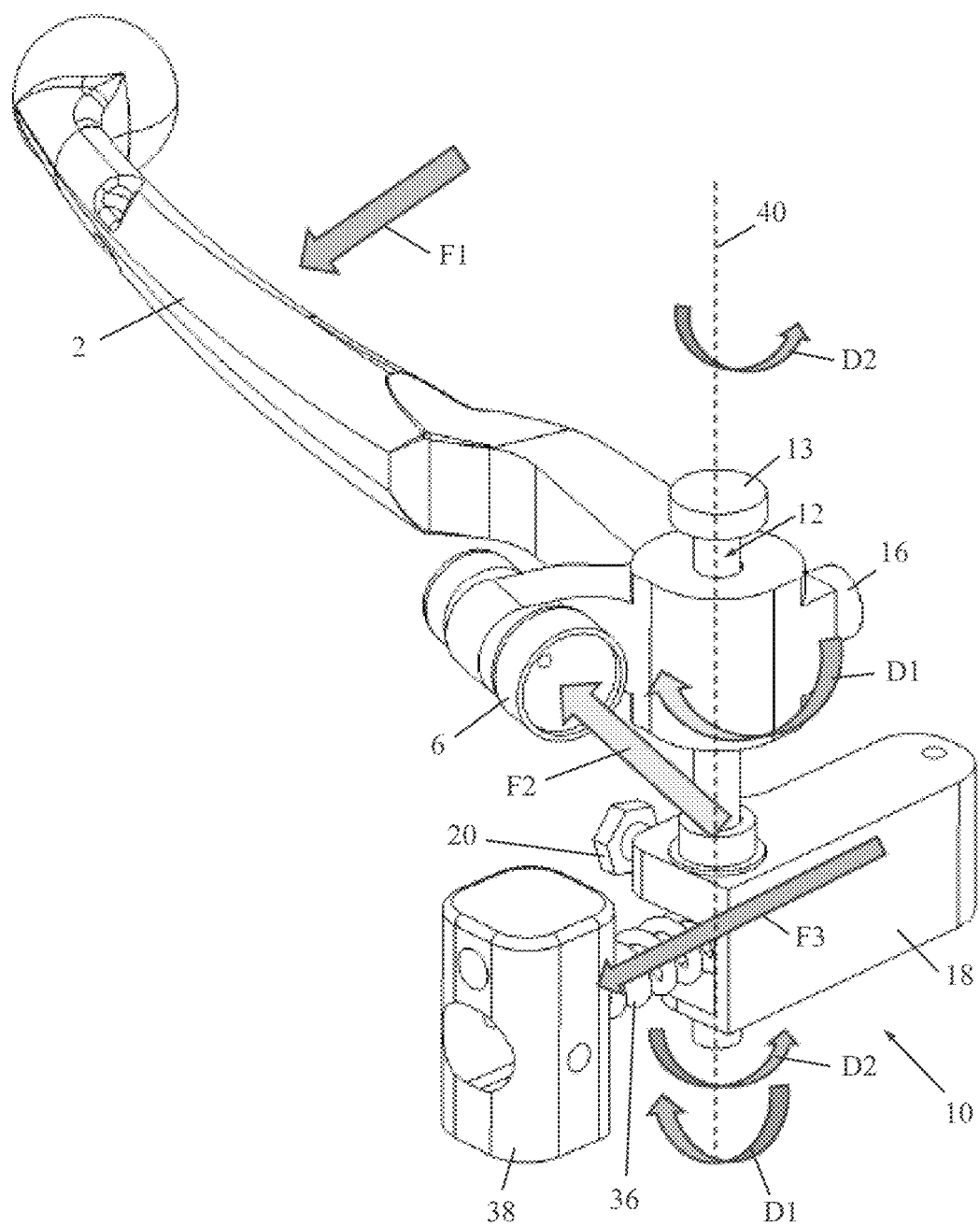
FIG. 3 is a simplified pictorial illustration of the clutch assist device, showing the forces applied by the different components.

Reference is now made to FIG. 3. The shaft 12 of the clutch assist device 10 has a central longitudinal axis 40. The force applied by squeezing handle 2 is F1. The force applied by hydraulic piston shaft 7 (FIG. 1B) against pusher 6 is F2. The force applied by biasing device 36 is F3. The clutch assist device 10 transforms force F3 into torque around central axis 40 in order to provide additional external torque and assist the rider in clutching. The force F3 can be transformed into torque in two opposite directions: direction D1 that resists pulling the handle or direction D2 that assists the pull. Device 10 can control the ratio between the amounts of torque in both ways depending on the location of biasing device 36 relative to the center axis 40.

Reference is now made to FIGS. 9A-9D, which illustrate using the clutch assist device 10.

Figure 9A:
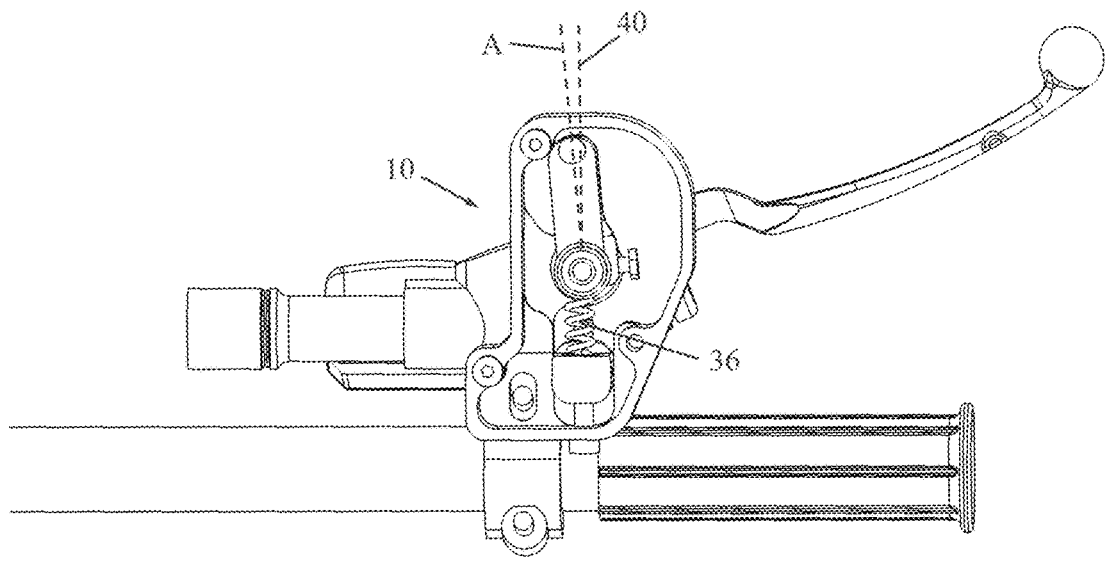
FIGS. 9A-9D are simplified pictorial illustrations of using the clutch assist device.

FIG. 9A shows when the handle is not squeezed. Normally when the rider does not squeeze the clutch handle, no force is exerted on the friction or clutch plates of the motorcycle. Instead of relying on the lack of any squeezing, the clutch assist device may apply a small, off-center biasing force (that is, off top-dead center) in a direction opposite to the handle squeezing force, which makes sure that when the clutch handle is not squeezed, the clutch assist device does not in any way cause the friction or clutch plates to engage, thus ensuring disengagement of the friction or clutch plates.

Thus in FIG. 9A, the resting position, when the handle is not engaged by the user, the biasing device 36 is slightly tilted to position A. At this position, biasing device 36 helps to open the handle to make sure no force is applied over the clutch plates; this force slightly opposes the pull of the rider on the handle.

Figure 9B:
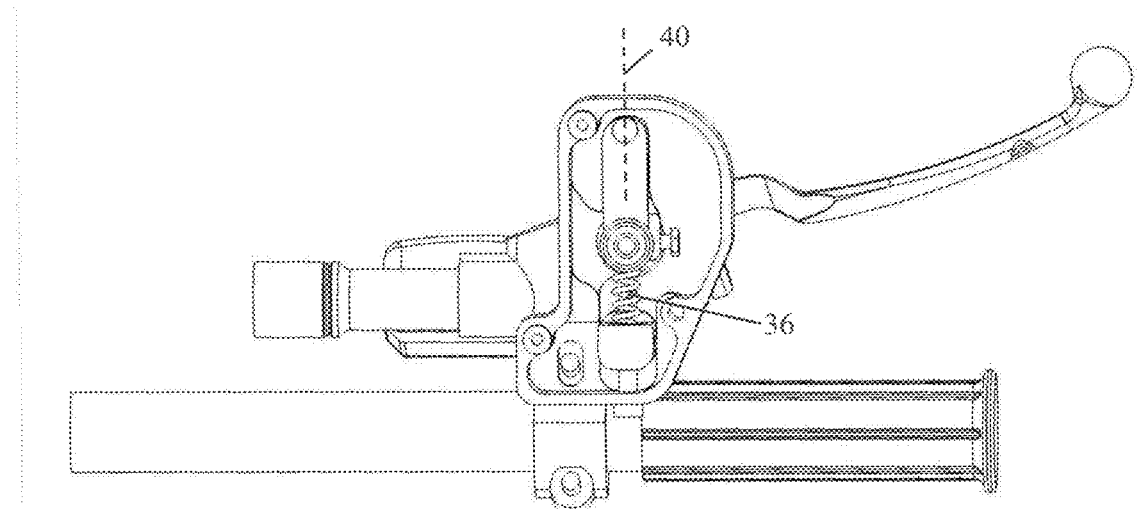
Figure 10A:
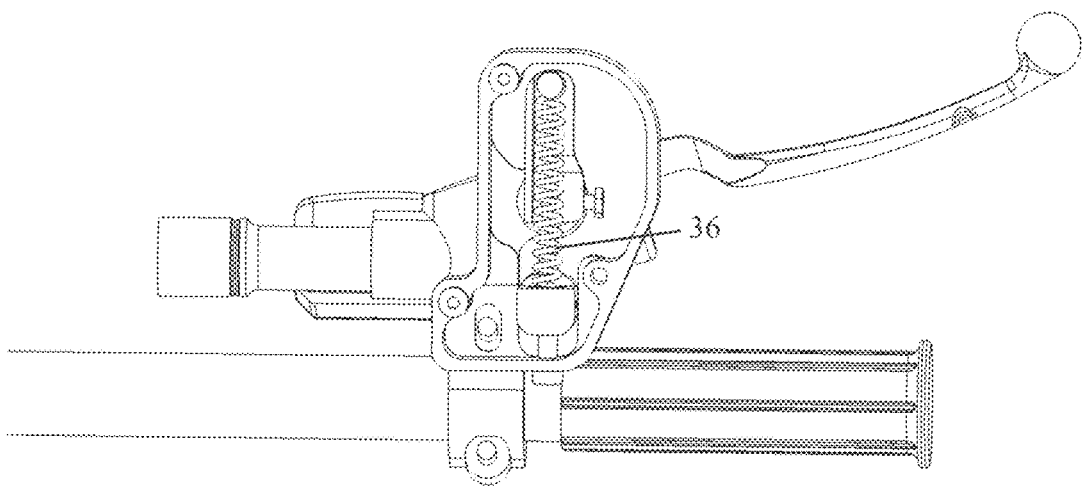
FIGS. 10A and 10B correspond to FIGS. 9B and 9D, respectively, and completely show the biasing device of the clutch assist device.

FIG. 9B (corresponding to FIG. 10A) shows the position when the user starts to pull (squeeze) the handle. This rotates the handle about the central axis 40 and brings the biasing device 36 to a neutral position along central axis 40. At this position, the mechanism does not apply any force or torque to resist or to support the user.

Figure 9C:
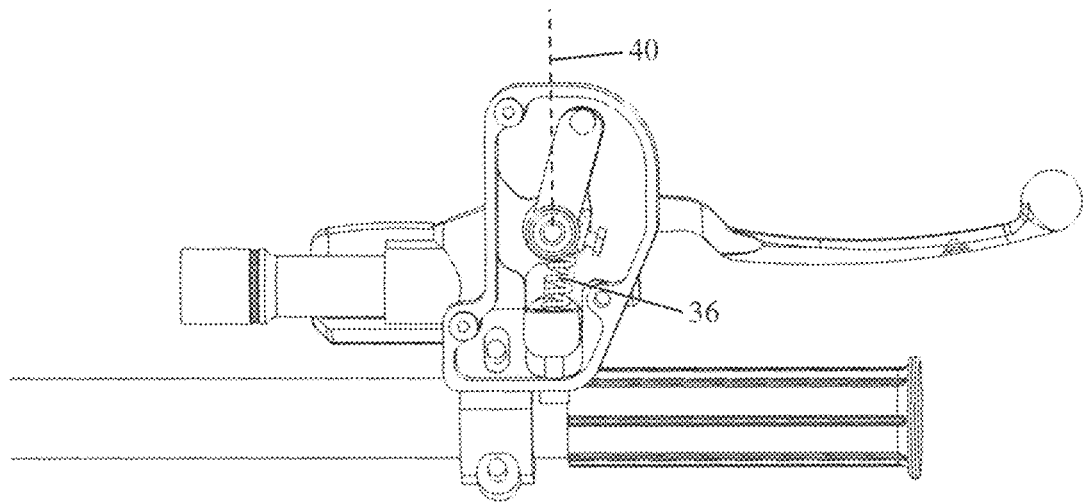

FIG. 9C shows the position when the user continues to pull the handle. This rotates the handle about the central axis 40 and brings the biasing device 36 past the neutral position and the mechanism applies a torque to assist the user.

Figure 9D:
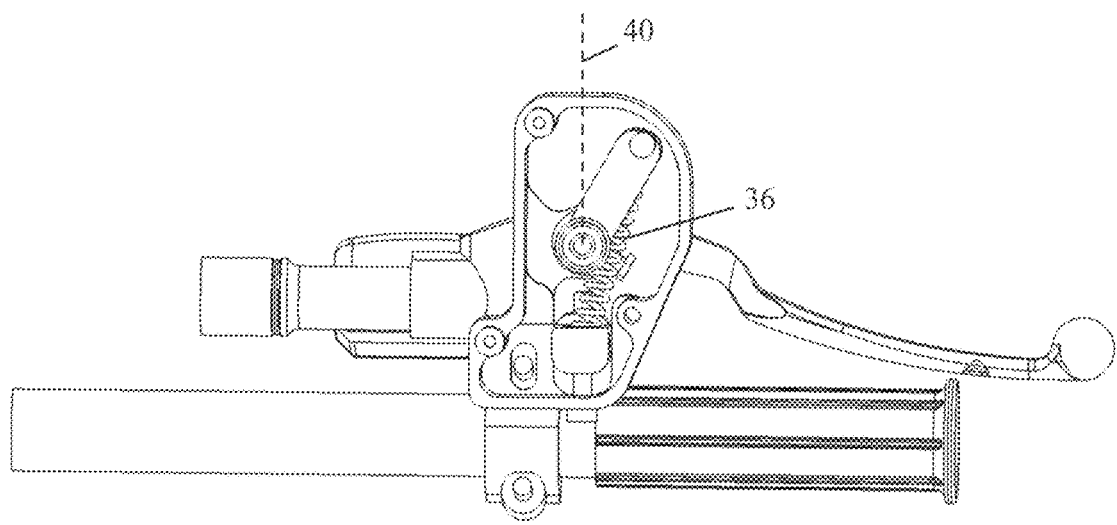
Figure 10B:
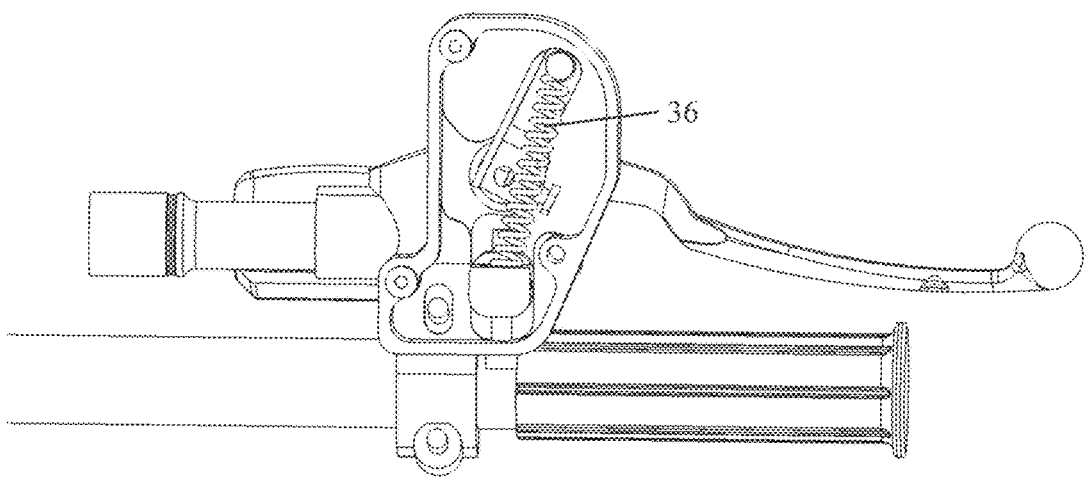
Figure 11A:
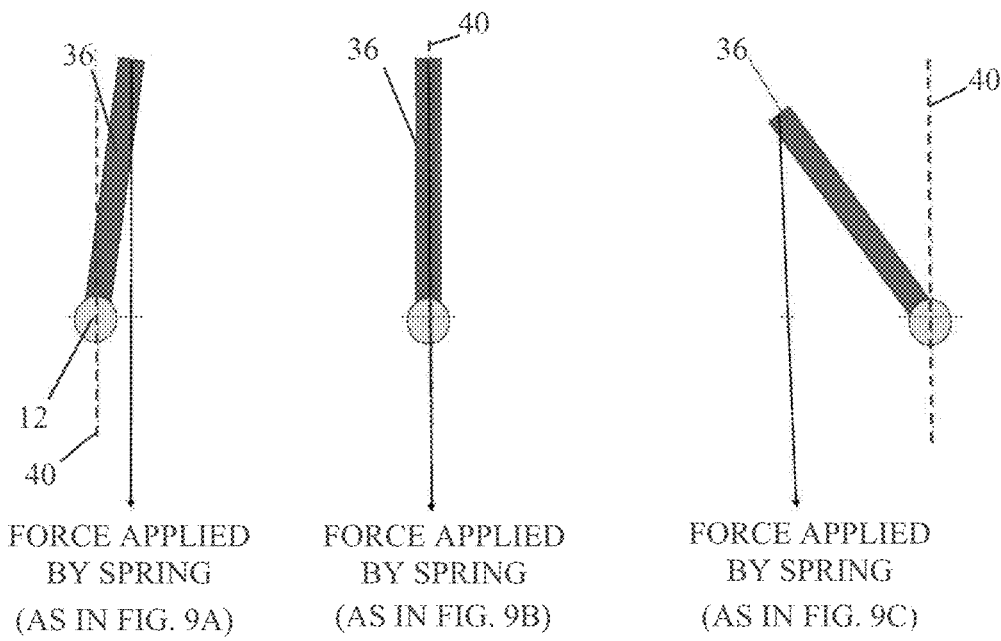
FIGS. 11A-11E are simplified illustrations of the forces or torques generated while squeezing the handle through angle theta.
Figure 11B:
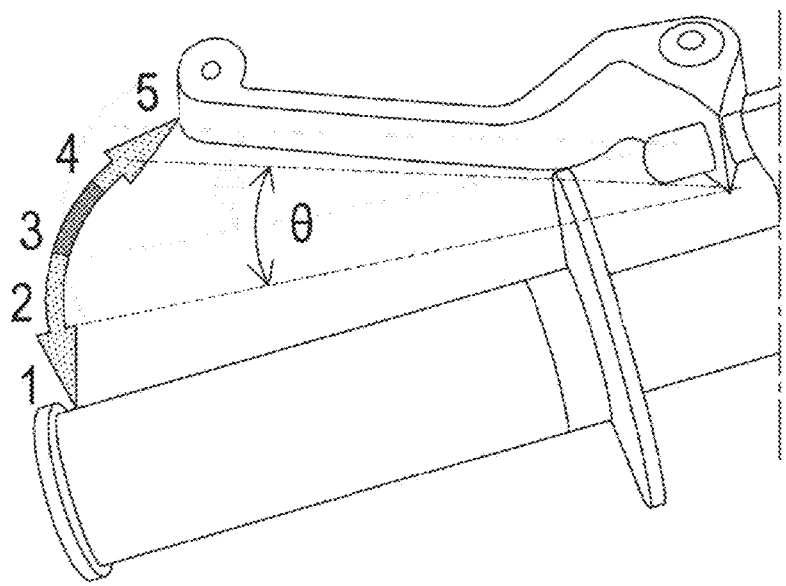
Figure 11C:
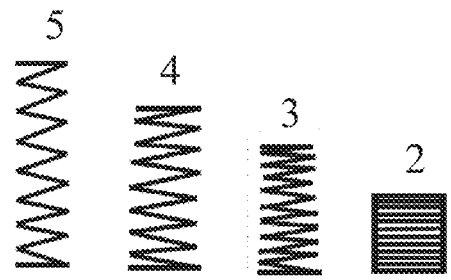
Figure 11C:
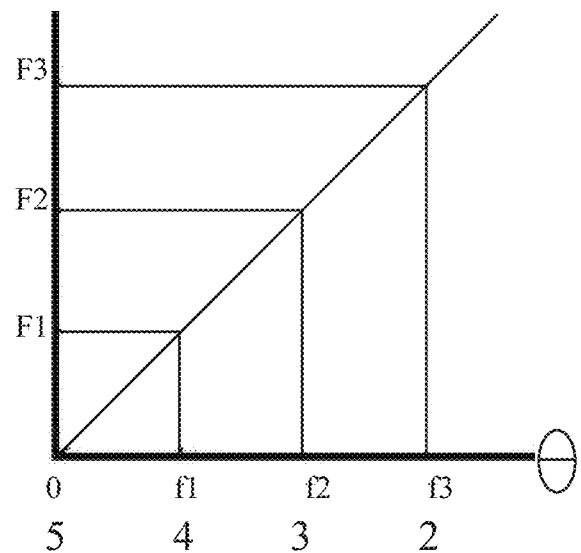
Figure 11D:
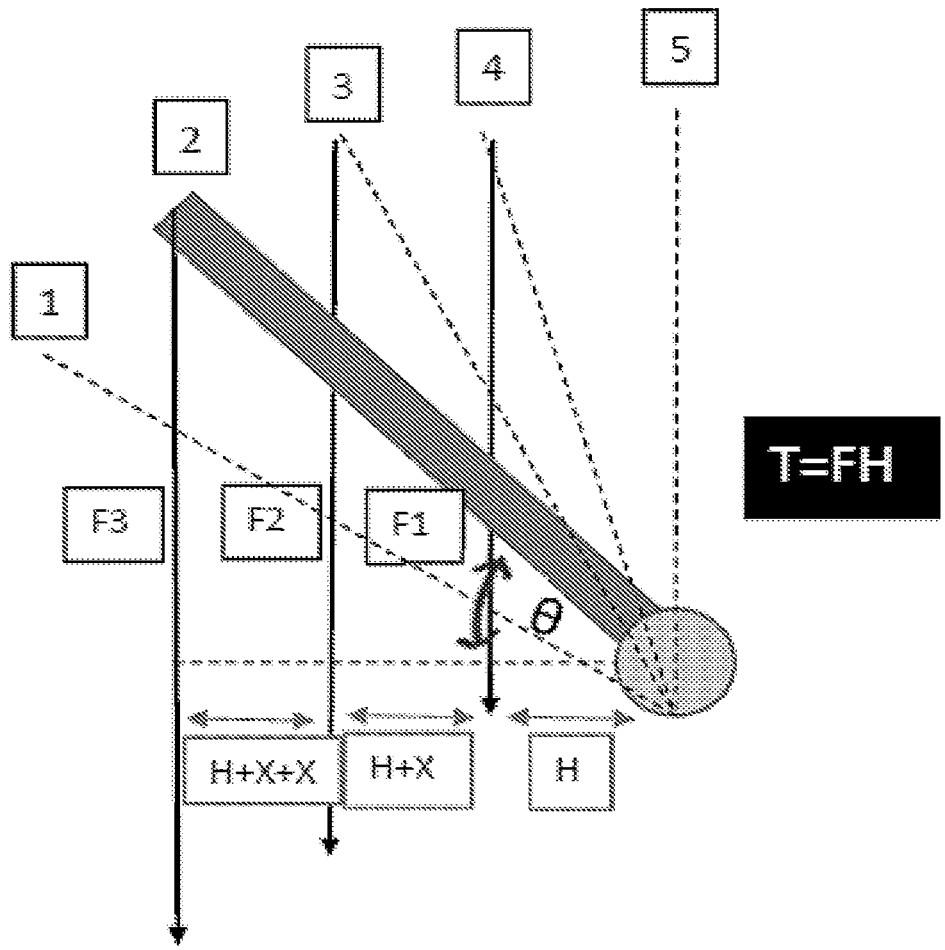
Figure 11E:
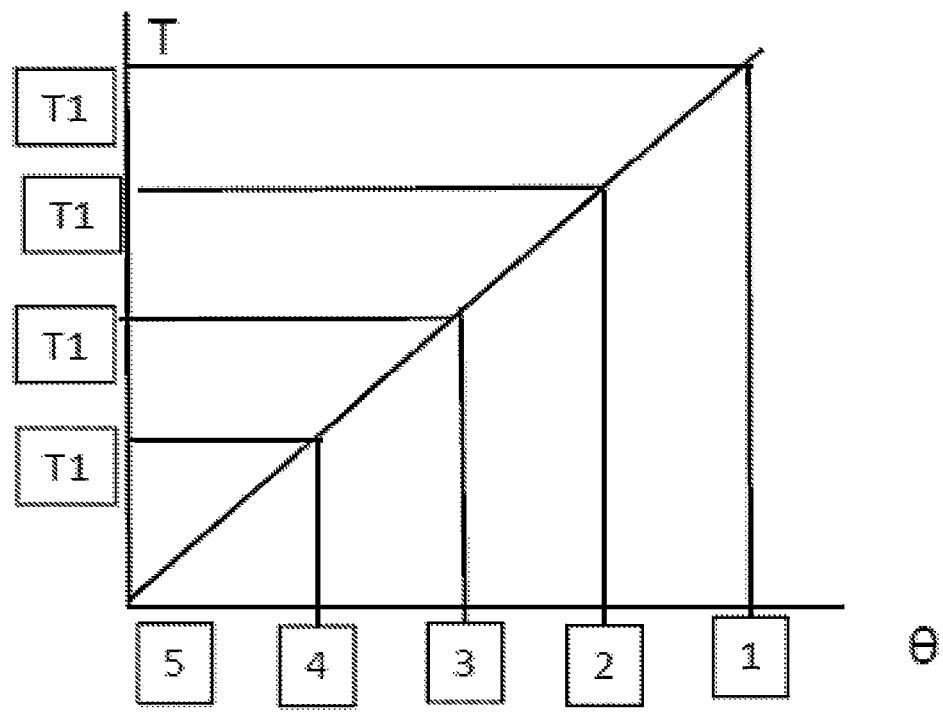

FIG. 9D (corresponding to FIG. 10B) shows the position when the user has fully squeezed the handle. Throughout the squeezing from FIG. 9C to FIG. 9D, the mechanism applies a torque to assist the user.

FIGS. 11A-11E are simplified illustrations of the forces or torques generated while squeezing the handle. It is noted that there may be predetermined rotational angles of the clutch handle relative to the clutch's oil piston, typically set by the manufacturer. The clutch assist device does not change these rotational angles in any way.

In another embodiment, an indicator may be provided that indicates the force or torque added by the clutch assist device so the rider can know the added force or torque and adjust this force or torque if desired.

In another embodiment of the invention, the same type of biasing device can be installed in the oil line of a hydraulic clutch that uses a hydraulically-operated piston to push the clutch plates. The biasing device moves past top-dead center (the central longitudinal axis) and increases the pushing force of the hydraulic piston.

What is claimed is:

1. A motorcycle clutch assist device comprising:
   a spring arm arranged for rotation or pivoting inside a housing;
   a biasing device coupled at one end thereof to an axle of said spring arm and at an opposite end thereof to a spring adaptor; and
   a shaft, one end of which is fixed to said spring arm and an opposite end of which is fixable to a clutch handle of a motorcycle, such that said clutch handle rotates about a central longitudinal axis of said shaft and squeezing said clutch handle transfers torque to said spring arm via said shaft, wherein when said biasing device is aligned with said central longitudinal axis no torque is applied by said biasing device, and squeezing said clutch handle causes said biasing device to move past said central longitudinal axis so that said biasing device applies an auxiliary torque to torque applied by squeezing said clutch handle.

2. The motorcycle clutch assist device according to claim 1, further comprising a spring tension screw coupled to said biasing device and operative to adjust tension of said biasing device.

3. The motorcycle clutch assist device according to claim 1, wherein said shaft is fixable to said clutch handle with a handle locking screw that fixedly abuts against a first flat surface of said shaft, and said shaft is fixed to said spring arm with a shaft screw that fixedly abuts against a second flat surface of said shaft.

4. The motorcycle clutch assist device according to claim 1, wherein a rest position of said biasing device is offset from said central longitudinal axis in a direction opposite to a squeezing force of said clutch handle.

5. A motorcycle clutch assist device comprising:
   a clutch handle of a motorcycle
   a spring arm arranged for rotation or pivoting inside a housing;
   a biasing device coupled at one end thereof to an axle of said spring arm and at an opposite end thereof to a spring adaptor; and
   a shaft, one end of which is fixed to said spring arm and an opposite end of which is fixed to said clutch handle, such that said clutch handle rotates about a central longitudinal axis of said shaft and squeezing said clutch handle transfers torque to said spring arm via said shaft, wherein when said biasing device is aligned with said central longitudinal axis no torque is applied by said biasing device, and squeezing said clutch handle causes said biasing device to move past said central longitudinal axis so that said biasing device applies an auxiliary torque to torque applied by squeezing said clutch handle.

6. The motorcycle clutch assist device according to claim 5, further comprising a spring tension screw coupled to said biasing device and operative to adjust tension of said biasing device.

7. The motorcycle clutch assist device according to claim 5, wherein said shaft is fixed to said clutch handle with a handle locking screw that fixedly abuts against a first flat surface of said shaft, and said shaft is fixed to said spring arm with a shaft screw that fixedly abuts against a second flat surface of said shaft.

8. The motorcycle clutch assist device according to claim 5, wherein a rest position of said biasing device is offset from said central longitudinal axis in a direction opposite to a squeezing force of said clutch handle.

9. The motorcycle clutch assist device according to claim 5, wherein a clutch pump is coupled to said housing by means of a pump locking screw.

10. The motorcycle clutch assist device according to claim 5, wherein said biasing device moves past said central longitudinal axis to increase a pushing force of a hydraulic piston.

* * * * *